United States Patent
Zhu

(10) Patent No.: US 11,516,805 B2
(45) Date of Patent: Nov. 29, 2022

(54) METHOD AND DEVICE FOR SELECTING BEAM

(71) Applicant: BEIJING XIAOMI MOBILE SOFTWARE CO., LTD., Beijing (CN)

(72) Inventor: Yajun Zhu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 17/011,454

(22) Filed: Sep. 3, 2020

(65) Prior Publication Data

US 2020/0404642 A1 Dec. 24, 2020

Related U.S. Application Data

(63) Continuation of application No. PCT/CN2018/081399, filed on Mar. 30, 2018.

(51) Int. Cl.
| | |
|---|---|
| *H04W 72/04* | (2009.01) |
| *H04W 24/02* | (2009.01) |
| *H04W 56/00* | (2009.01) |
| *H04W 72/08* | (2009.01) |
| *H04W 74/08* | (2009.01) |
| *H04W 84/04* | (2009.01) |

(52) U.S. Cl.
CPC ......... *H04W 72/046* (2013.01); *H04W 24/02* (2013.01); *H04W 56/001* (2013.01); *H04W 72/085* (2013.01); *H04W 74/0833* (2013.01); *H04W 84/042* (2013.01)

(58) Field of Classification Search
CPC . H04W 72/046; H04W 72/085; H04W 24/02; H04W 56/001; H04W 74/0833; H04W 84/042; H04L 5/0023; H04L 5/0053
See application file for complete search history.

(56) References Cited

U.S. PATENT DOCUMENTS

| 9,154,204 B2 | 10/2015 | Harel et al. |
| 9,692,459 B2 | 6/2017 | Maltsev et al. |
| 9,872,337 B2 | 1/2018 | Ayach et al. |
| 11,330,457 B2 * | 5/2022 | Yu .......................... H04L 5/0048 |
| 2013/0329820 A1 | 12/2013 | Harel et al. |

(Continued)

FOREIGN PATENT DOCUMENTS

| CN | 105122664 A | 12/2015 |
| CN | 106455040 A | 2/2017 |

(Continued)

OTHER PUBLICATIONS

International Search Report in the international application No. PCT/CN2018/081399, dated Dec. 14, 2018.

(Continued)

*Primary Examiner* — Siu M Lee
(74) *Attorney, Agent, or Firm* — Syncoda LLC; Feng Ma

(57) ABSTRACT

A method for selecting a beam includes: receiving positions for monitoring data to be transmitted within a set transmission period are determined. Data to be transmitted sent by a data sending terminal using different beams are monitored at the receiving positions. The data to be transmitted can indicate a transmission beam corresponding to the data. An optimal transmission beam can be determined based on monitoring results.

15 Claims, 16 Drawing Sheets

(56) References Cited

U.S. PATENT DOCUMENTS

| | | | |
|---|---|---|---|
| 2014/0148107 A1 | 5/2014 | Maltsev | |
| 2016/0219569 A1* | 7/2016 | Kuo | H04W 72/042 |
| 2017/0171887 A1 | 6/2017 | Shi et al. | |
| 2017/0171912 A1 | 6/2017 | Ayach et al. | |
| 2018/0092156 A1* | 3/2018 | Kim | H04W 72/1273 |
| 2018/0132222 A1 | 5/2018 | Kuo | |
| 2018/0146468 A1 | 5/2018 | Kuo | |
| 2019/0182682 A1* | 6/2019 | Kim | H04W 16/28 |
| 2019/0223043 A1* | 7/2019 | Geng | H04L 5/0057 |
| 2019/0223222 A1* | 7/2019 | Nagaraja | H04B 7/088 |
| 2019/0306847 A1* | 10/2019 | Seo | H04L 25/022 |
| 2020/0068549 A1* | 2/2020 | Kang | H04B 7/0695 |
| 2020/0213978 A1* | 7/2020 | Iyer | H04L 1/1812 |
| 2020/0275514 A1* | 8/2020 | Takahashi | H04W 72/042 |
| 2021/0105820 A1* | 4/2021 | Kim | H04B 7/0695 |
| 2021/0136746 A1 | 5/2021 | Kuo et al. | |
| 2021/0176787 A1* | 6/2021 | Ohara | H04W 74/0833 |

FOREIGN PATENT DOCUMENTS

| | | |
|---|---|---|
| CN | 106470062 A | 3/2017 |
| CN | 106953673 A | 7/2017 |
| CN | 107223361 A | 9/2017 |
| CN | 107852351 A | 3/2018 |
| CN | 109792347 B | 8/2022 |
| EP | 2847881 A1 | 3/2015 |
| EP | 3297375 A1 | 3/2018 |
| EP | 3484230 A1 | 5/2019 |
| WO | 2018030824 A1 | 2/2018 |
| WO | 2018053850 A1 | 3/2018 |

OTHER PUBLICATIONS

First Office Action of the Indian application No. 202047046880, dated Jul. 12, 2021.
English Translation of the Written Opinion of the International Search Authority in the international application No. PCT/CN2018/081399, dated Dec. 14, 2018.
Supplementary European Search Report in European application No. 18911750.0, dated Oct. 27, 2021.
Li Ming-liang et al., "Random Beamforming Based Physical-Layer Security in MISO-OFDMA System", Journal of Information Engineering University vol. 14 No. 3, Jun. 15, 2013.
Huang Ji-hai et al., "Prevent Malicious Interference Signal Transmission Monitoring Vehicles Communication Network Simulation", Computer Simulation vol. 34 No. 4, Apr. 15, 2017.

* cited by examiner

METHOD AND DEVICE FOR SELECTING BEAM

CROSS-REFERENCE TO RELATED APPLICATIONS

This is a continuation application of International Patent Application No. PCT/CN2018/081399 filed on Mar. 30, 2018, the disclosure of which is hereby incorporated by reference in its entirety.

BACKGROUND

With the rapid development of wireless communication technologies, most of spectrum resources on the licensed spectrum are occupied by various communication systems. Therefore, in order to expand frequency resources and improve a beam selection rate and throughput, wireless communication systems have expanded the operation frequency bands to unlicensed spectra. For the frequency bands having better signal transmission characteristics, such as low-frequency bands, wireless communication systems are deployed crowdedly. In the 5th Generation (5G) mobile communication technology systems, higher-frequency bands are employed, and data are transmitted by radio beams.

SUMMARY

The present disclosure generally relates to the field of communication technology, and more particularly, to a method and device for selecting a beam.

In order to overcome the problems in the related art, the embodiments of the present disclosure provide a method and device for selecting a beam, to implement quickly acquiring an optimal beam in an initial access process of the user equipment.

According to a first aspect of the embodiments of the present disclosure, a method for selecting a beam is provided, which is applied to a data receiving terminal, and includes the following operations.

Receiving positions for monitoring data to be transmitted within a set transmission period are determined.

The data to be transmitted sent by a data sending terminal using different beams is monitored at the receiving positions. The data to be transmitted can indicate a transmission beam corresponding to the data to be transmitted.

An optimal transmission beam is determined based on monitoring results.

According to a second aspect of the embodiments of the present disclosure, a method for selecting a beam is provided, which is applied in a data sending terminal, and includes the following operations.

A target sending position for each beam is determined based on a channel state of a channel to be detected and a set position parameter within a set transmission period.

The data to be transmitted is sent by a corresponding transmission beam at the target sending position for each beam, so that a data receiving terminal determines an optimal beam based on monitoring results of monitoring the data to be transmitted.

According to a third aspect of the embodiments of the present disclosure, a data receiving terminal is provided, which includes a processor; and a memory used for storing processor-executable instructions.

The processor is configured to determine receiving positions for monitoring data to be transmitted within a set transmission period; and monitor, at the receiving positions, the data to be transmitted sent by a data sending terminal using different beams, the data to be transmitted being able to indicate a transmission beam corresponding to the data; and determine an optimal transmission beam based on monitoring results.

It should be understood that the above general description and the following detailed description are only exemplary and explanatory, and do not limit the present disclosure.

BRIEF DESCRIPTION OF THE DRAWINGS

The accompanying drawings referred to in the specification are a part of this disclosure, and provide illustrative embodiments consistent with the disclosure and, together with the detailed description, serve to illustrate some embodiments of the disclosure.

DETAILED DESCRIPTION

Figure 1A:
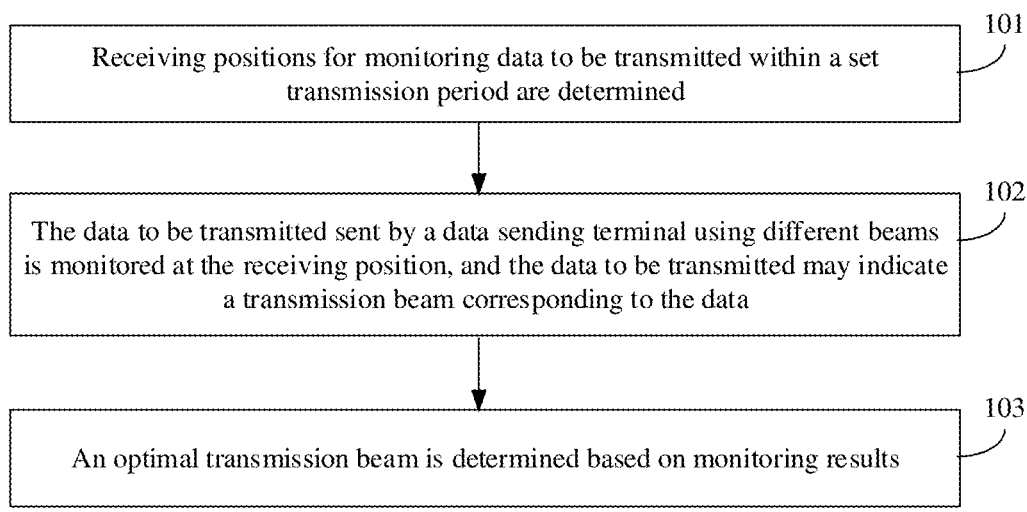
FIG. 1A is a flowchart of a method for selecting a beam according to some embodiments of the present disclosure.

Exemplary embodiments (examples of which are illustrated in the accompanying drawings) are elaborated below. The following description refers to the accompanying drawings, in which identical or similar elements in two drawings are denoted by identical reference numerals unless indicated otherwise. The exemplary implementation modes may take on multiple forms, and should not be taken as being limited to examples illustrated herein. Instead, by providing such implementation modes, embodiments herein may become more comprehensive and complete, and comprehensive concept of the exemplary implementation modes may be delivered to those skilled in the art. Implementations set forth in the following exemplary embodiments do not represent all implementations in accordance with the subject disclosure. Rather, they are merely examples of the apparatus and method in accordance with certain aspects herein as recited in the accompanying claims.

Use the unlicensed frequency bands may be through a mechanism of License Assisted Access (LAA). That is, the use of the unlicensed frequency band is assisted by the licensed frequency band. In order to ensure coexistence with other communication systems that operate on unlicensed frequency bands, such as Wireless-Fidelity (Wi-Fi), a channel competition access mechanism of Listen-Before-Talk (LBT) is introduced in the LAA. The sending terminal needs to detect whether the channel is idle when there is data to be sent, and the sending terminal sends data only when the channel is idle. The base station may transmit data using different beams at different times, and the user equipment determines an optimal transmission beam and transmission beams with the base station in an initial access process. Because channel detection is required in the unlicensed frequency band, the user equipment is unable to determine the optimal beam in the initial access process when the channel is busy, which affects performance of the system.

Various embodiments provided by the present disclosure can be applicable to a process in which user equipment (UE) accesses a system which uses a beam for transmission.

Figure 1B:
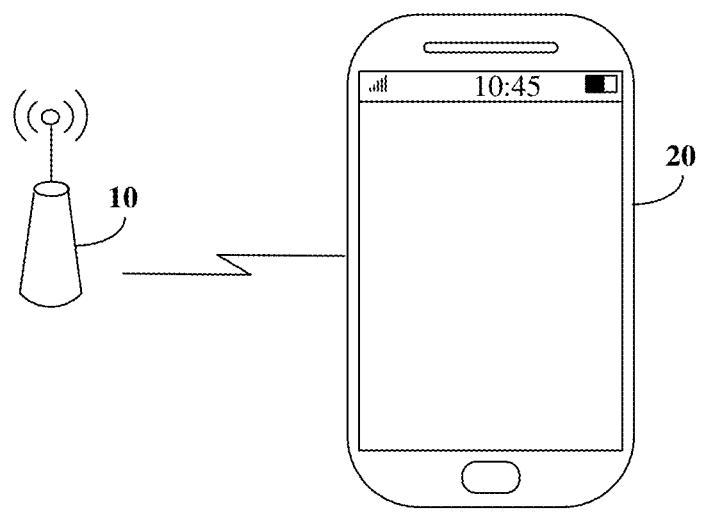
FIG. 1B is a schematic scenario diagram of a method for selecting a beam according to some embodiments of the present disclosure.
Figure 1:
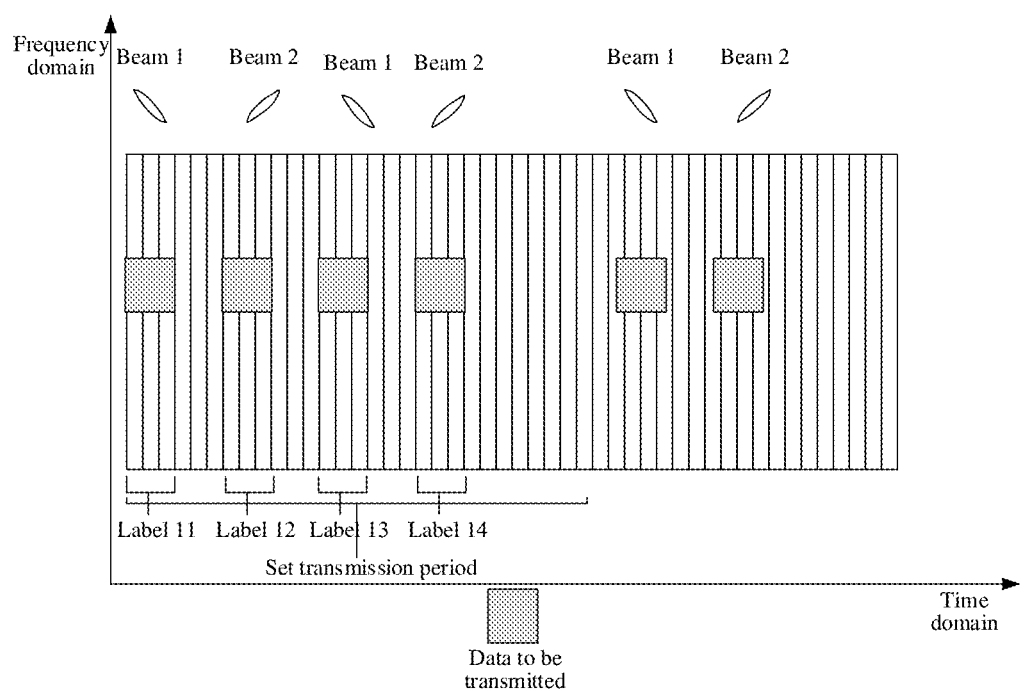
FIG. 1C is a first schematic diagram of sending data to be transmitted using different beams according to some embodiments of the present disclosure.
FIG. 1D is a second schematic diagram of sending data to be transmitted using different beams according to some embodiments of the present disclosure.
Figure 1D:
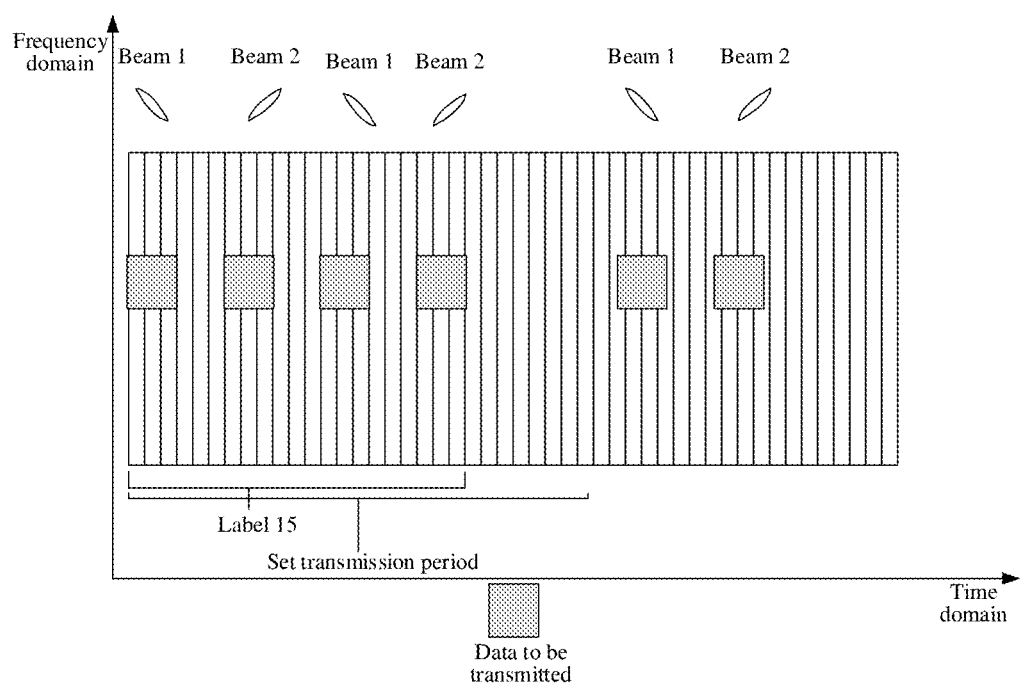

FIG. 1A is a flowchart of a method for selecting a beam according to some embodiments of the present disclosure, FIG. 1B is a schematic scenario diagram of a method for selecting a beam according to some embodiments of the present disclosure, FIG. 1C is a first schematic diagram of sending data to be transmitted using different beams according to some embodiments of the present disclosure, FIG. 1D is a second schematic diagram of sending data to be transmitted using different beams according to some embodiments of the present disclosure. The method for selecting a beam may be applied to a data receiving terminal, such as a user equipment and a base station, as shown in FIG. 1A, the method for selecting a beam method includes operations 101 to 103.

At 101, receiving positions for monitoring data to be transmitted within a set transmission period are determined.

In some embodiments, the receiving positions for monitoring the data to be transmitted within the set transmission period may be configured by a base station. If the user equipment is the data receiving terminal, the base station may send the receiving positions to the user equipment using radio resource control (RRC) signaling, a media access control (MAC) control element (CE) or physical layer signaling. In some embodiments, the receiving positions for monitoring the data to be transmitted within the set transmission period may also be agreed in advance by the system in the agreement.

In some embodiments, the receiving positions for monitoring the data to be transmitted within the set transmission period may be time points within the set transmission period, for example, time points labelled by the label 11 to label 14 shown in FIG. 1C. In some embodiments, the receiving positions for monitoring the data to be transmitted in the set transmission period may be a time window in the set transmission period, for example, a time window labelled with label 15 shown in FIG. 1D, the data receiving terminal may continuously monitor the data to be transmitted at the time window.

In some embodiments, when the user equipment is a data receiving terminal, the data to be transmitted may be a synchronous block signal, or a synchronous block signal and other signaling or signal which can indicate beam information of a transmission beam. The specific processes for data sending and receiving may refer to embodiments shown in FIG. 2 and FIG. 3A respectively. When the base station is a data receiving terminal, the data to be transmitted may be a random access preamble for performing access by the user equipment, and the specific processes for data sending and receiving refer to some embodiments shown in FIG. 4.

At 102, data to be transmitted sent by a data sending terminal using different beams is monitored at the receiving positions. The data to be transmitted may indicate a transmission beam corresponding to the data to be transmitted.

In some embodiments, the system may preliminarily establish correspondences between data to be transmitted and transmission beams according to implicit rules. When data is sent through a transmission beam, the data (such as a synchronous block signal, a random access preamble) to be transmitted corresponding to the transmission beam is selected to be sent.

In some embodiments, the data to be transmitted may explicitly carry beam information for identifying the transmission beam, and thus the data to be transmitted can indicate the transmission beam corresponding to the data.

At 103, an optimal transmission beam is determined based on monitoring results.

In some embodiments, after the data receiving terminal performs monitoring operations at all the receiving positions within the set transmission period, an optimal transmission beam may be determined based on the data to be transmitted monitored at each receiving position, and a data transmission beam corresponding to the data to be transmitted with the highest receiving quality may be determined as an optimal transmission beam. For example, four receiving positions are set in the transmission period, and two data to be transmitted are monitored. Data 1 to be transmitted is sent through beam 1, and data 2 to be transmitted is sent through beam 2. The signal receiving quality of data 1 to be transmitted is higher than that of data 2 to be transmitted. It is determined that the beam 1 is superior to the beam 2, and the beam 1 may be determined as an optimal transmission beam.

In an exemplary scenario, as shown in FIG. 1B, taking a new generation network (such as a 5G network) as an example of a mobile network and taking a gNB as an example of a base station for illustration, but the technical solution of the present disclosure is not limited to be applied in the new generation network. In the scenario shown in FIG. 1B, gNB10 and UE20 are included. During an initial access process, UE20 may monitor a synchronous block signal sent by gNB10 within a set transmission period (a synchronous block signal transmission period) or other signaling or signals that can identify the beam, and determine an optimal transmission beam based on a monitoring result within the set transmission period. In some embodiments, gNB10 may also monitor a random access preamble sent by UE20 within the set transmission period and determine an optimal transmission beam based on a monitoring result within the set transmission period.

In some embodiments, the data receiving terminal may monitor the data to be transmitted at more than two receiving positions within the set transmission period by the above operations 101 to 103. For example, the synchronous block signal or other signaling or signal that can indicate a transmission beam is monitored in more than two receiving positions within a synchronous block signal transmission period, and an optimal transmission beam is determined based on monitoring results. Thus, the technical solution of the present disclosure enables the data receiving terminal to monitor the data to be transmitted in more than two receiving positions during an initial access process of the user equipment, and to determine an optimal beam for communication, thereby avoiding the problem in the related art that the optimal beam cannot be determined by the user equipment during the initial access process when the channel is busy.

The technical solutions according to the embodiments of the present disclosure are described with specific embodiments.

Figure 2:
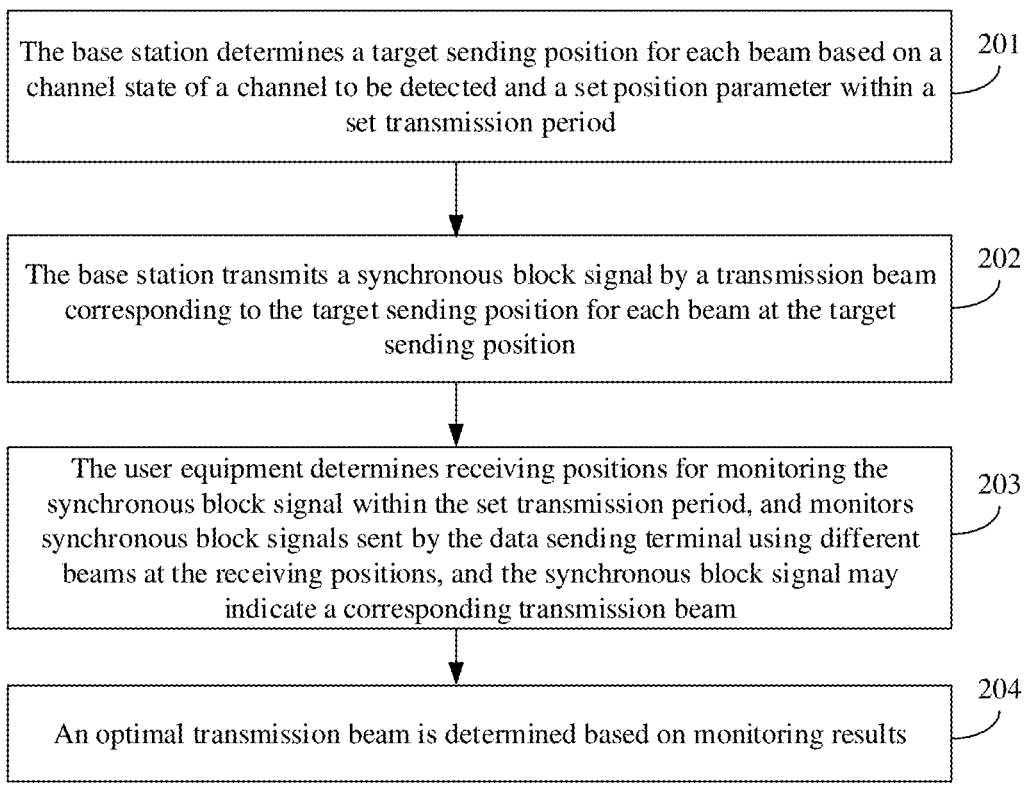
FIG. 2 is a flowchart of interaction between entities in another method for selecting a beam according to some embodiments of the present disclosure.

FIG. 2 is a flowchart of interaction between entities in another method for selecting a beam according to some embodiments of the present disclosure. In some embodiments, the above method provided by the embodiments of the present disclosure is used, in which a base station is taken as a data sending terminal, a user equipment is taken as a data receiving terminal, and a synchronous block signal is taken as data to be transmitted for exemplary illustration. The base station may execute the technical solution of the embodiment when channel detection is failed and the synchronous block signal cannot be transmitted. As shown in FIG. 2, the following operations are included.

At 201, the base station determines a target sending position for each beam based on a channel state of a channel to be detected and a set position parameter within a set transmission period.

In some embodiments, the set position parameter may be a set of positions of multiple sending positions. Referring to labels 11 to 14 in FIG. 1C, four sending positions may be set in a synchronous block signal transmission period, label 11 and label 13 denote sending positions for beam 1, and label 12 and label 14 denote sending positions for beam 2. In some embodiments, referring to the label 15 in FIG. 1D, a sending window for sending a synchronous block signal may be set in a synchronous block signal transmission period, and the sending window may include multiple sending positions for each beam.

In some embodiments, the set position parameter may be agreed by the system agreement. In some embodiments, the set position parameter may be set by the base station, and the set position parameter is sent to the user equipment by RRC signaling, or an MAC CE or physical layer signaling.

In some embodiments, the base station may send synchronous block signals using different beams at multiple sending positions determined based on the set position parameter, but the base station needs to measure signal energy of a channel when sending data using an unlicensed spectrum resources, and determine whether the channel is idle based on the signal energy of the channel. If the channel is not idle, the base station cannot use a corresponding beam on the channel to send data. Therefore, the sending position used for sending the synchronous block signal is a resource, in which a channel state is idle, determined based on the set position parameter.

At 202, the base station transmits a synchronous block signal using a transmission beam corresponding to the target sending position at the target sending position for each beam.

In some embodiments, referring to labels 11 to 14 in FIG. 1C, four sending positions may be set in a synchronous block signal transmission period. A synchronous block signal is sent by beam 1 at the sending positions labelled by labels 11 and 13, and the synchronous block signal is sent by beam 2 at the sending positions labelled by labels 12 and 14. If channel detection for the sending position labeled with label 11 is failed, channel detection is performed on a sending position labelled by label 13, and when the channel detection is successful, a synchronous block signal is sent by beam 1 at a sending position labelled by label 13.

In some embodiments, for each beam, if multiple sending positions, at which a channel is in an unoccupied state, are determined in a synchronous block signal transmission period, a first sending position, at which the channel is in the unoccupied state, may be determined as a target sending position. That is, there is only one target sending position for each beam. In some embodiments, for each beam, if multiple sending positions, at which a channel is in an unoccupied state, are determined within a synchronous block signal transmission period, all the sending positions at which a channel is in an unoccupied state may be determined as the target sending positions. That is, there may be multiple target sending positions for each beam.

In some embodiments, referring to label 15 in FIG. 1D, a sending window for sending a synchronous block signal may be set within a synchronous block signal transmission period. In the sending window, the base station may detect a channel state of the channel continuously, and when the channel detection is successful, the base station sends a synchronous block signal at a first position or all positions where the channel detection is successful using each beam.

At 203, the user equipment determines receiving positions for monitoring synchronous block signals within the set transmission period, and monitors synchronous block signals sent by the data sending terminal using different beams at the receiving positions. The synchronous block signal can indicate a transmission beam corresponding to the synchronous block signal.

In some embodiments, the user equipment may determine the receiving position for monitoring the synchronous block signal within the set transmission period based on the set position parameter.

In some embodiments, the system may preliminarily establish correspondences between synchronous block signals and transmission beams according to implicit rules. When data is sent through a transmission beam, a synchronous block signal (such as a synchronous block signal, a random access preamble) corresponding to the transmission beam is selected to be sent.

In some embodiments, the synchronous block signal may explicitly carry beam information for identifying the transmission beam, thereby the synchronous block signal can indicate a transmission beam corresponding to the synchronous block signal.

At 204, an optimal transmission beam is determined based on monitoring results.

In some embodiments, regarding operation 204, reference may be made to the description of operation 103 in the embodiment shown in FIG. 1A, and details are not described here.

In some embodiments, an implementation manner of determining an optimal transmission beam during an initial access process of the user equipment is disclosed. The base station may send synchronous block signals using different beams at multiple sending positions within a set transmission period. In this way, an optimal beam for communication is determined by the user equipment during the initial access process, thereby avoiding the problem in the related art that the optimal beam cannot be determined by the user equipment during the initial access process when the channel is busy.

Figure 3A:
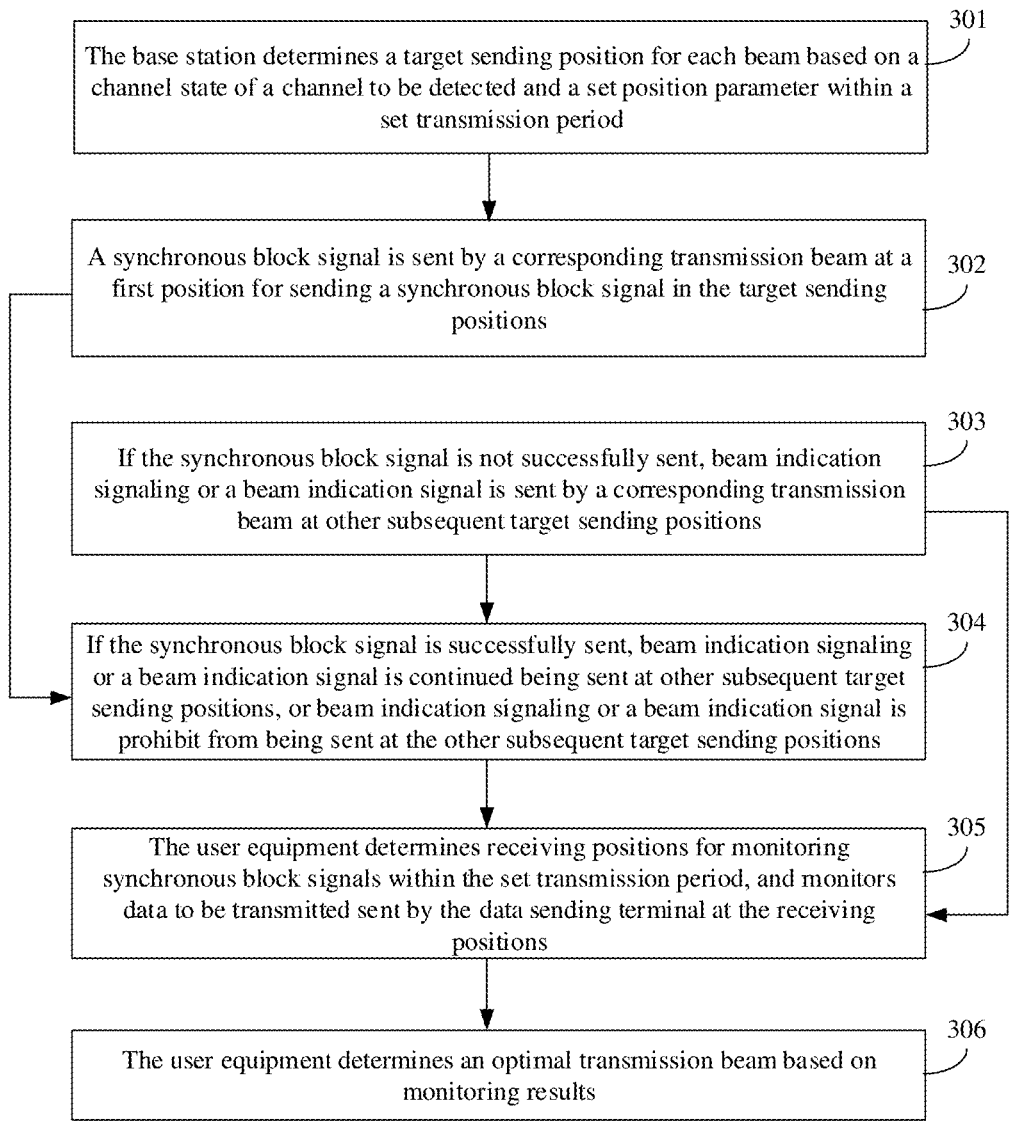
FIG. 3A is a flowchart of interaction between entities in another method for selecting a beam according to some embodiments of the present disclosure.
Figure 3B:
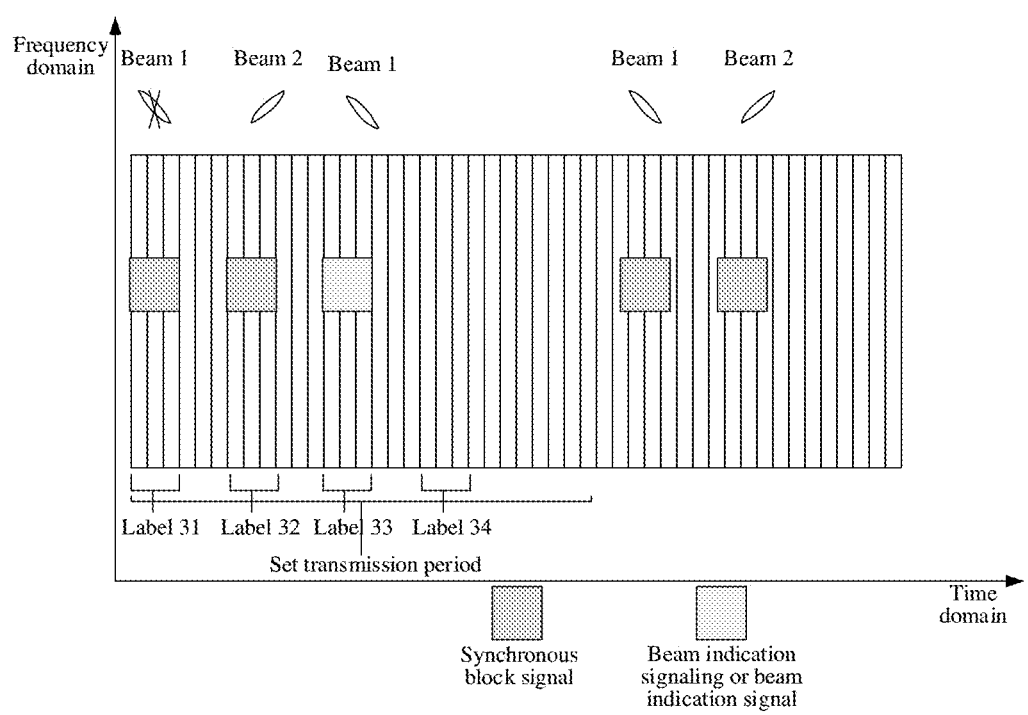
FIG. 3B is a third schematic diagram of sending data to be transmitted using different beams according to some embodiments of the present disclosure.

FIG. 3A is a flowchart of interaction between entities in another method for selecting a beam according to some embodiments of the present disclosure, and FIG. 3B is a third schematic diagram of sending data to be transmitted through different beams according to some embodiments of the present disclosure. In some embodiments, the above method provided by the embodiments of the present disclosure are used, in which, a base station is taken as a data sending terminal, a user equipment is taken as a data receiving terminal, and a synchronous block signal and other signaling or signals that can identify the beam are taken as data to be transmitted for exemplary illustration. The base station may execute a technical solution according to the embodiment when channel detection is failed and a synchronous block signal cannot be transmitted. As shown in FIG. 3A, operations 301 to 306 are included.

At 301, the base station determines a target sending position for each beam based on a channel state of a channel to be detected and a set position parameter within a set transmission period.

In some embodiments, the base station may send synchronous block signals, or beam indication signaling or beam indication signals using different beams at multiple sending positions determined based on the set position parameter, but the base station needs to measure signal energy of a channel when sending data using an unlicensed spectrum resources, and determine whether the channel is idle based on the signal energy of the channel. If the channel is not idle, the base station cannot use a corresponding beam for sending data on the channel. Therefore, the sending position used for sending the synchronous block signal, the beam indication signaling or the beam indication signal is a resource, in which a channel state is idle, determined based on the set position parameter.

In some embodiments, referring to the labels 31 to 34 in FIG. 3B, a target sending position which may be set for each beam in a synchronous block signal transmission period may include more than one sending position. For sending a synchronous block signal, a sending position for sending a synchronous block signal may be pre-configured for each beam, and other sending positions are used to send the beam indication signaling or the beam indication signals. For example, the synchronous block signal is sent by beam 1 at the sending position labelled by label 31, and the synchronous block signal is sent by beam 2 at the sending position labelled by label 32, and beam indication signaling or a beam indication signal may be used at a subsequent sending position. If the beam indication signaling or the beam indication signal is sent by beam 1 at the sending position labelled by label 33, and the beam indication signaling or the beam indication signal is sent by beam 2 at the sending position labelled by label 34.

In some embodiments, if a synchronous block signal is successfully sent by beam 1 within a set transmission period, beam indication signaling or a beam indication signal may be sent by beam 1 at a subsequent sending position, or beam indication signaling or a beam indication signal is not sent by beam 1 subsequently.

In some embodiments, referring to label 15 in FIG. 1D, a sending window for sending a synchronous block signal may be set within a synchronous block signal transmission period, and the sending window may include multiple positions used to send the data to be transmitted. For each beam, if multiple positions, at which a channel is in an unoccupied state, are determined in the sending window, a first position, at which a channel is in an unoccupied state, may be determined as a target sending position. That is, there is only one target sending position for each beam. In some embodiments, for each beam, if multiple positions, at which a channel is in an unoccupied state, are determined in the sending window, all of the positions, at which a channel is in an unoccupied state, may be determined as the target sending positions. That is, there may be multiple target sending positions for each beam.

In some embodiments, the set position parameter may be set by the system agreement. In some embodiments, the set position parameter may be set by the base station, and the set position parameter is sent to the user equipment by RRC signaling, or an MAC CE or physical layer signaling.

At 302, a synchronous block signal is sent by a corresponding transmission beam at a first position for sending a synchronous block signal in the target sending positions, and operation 303 or 304 is executed.

At 303, if the synchronous block signal is not successfully sent, beam indication signaling or a beam indication signal is sent by a corresponding transmission beam at other subsequent target sending positions, and operation 305 is executed.

In some embodiments, the beam indication signaling or the beam indication signal may identify beam information of the transmission beam. The beam indication signal may be a pre-defined pilot sequence, the beam indication signaling may be dedicated signaling used to indicate the transmission beam, or may be existing signaling. The data receiving terminal may be ensured to identify a transmission beam of the beam indication signaling by carrying beam information for identifying a transmission beam in the existing signaling.

In some embodiments, those skilled in the art may understand that the beam indication signaling may be signaling carried on a certain channel and having a certain transmission format, and content of the signaling needs to carry beam information for identifying transmission beam, and content of other parts of the signaling is not limited.

At 304, if the synchronous block signal is successfully sent, beam indication signaling or a beam indication signal is continued being sent at other subsequent target sending positions, or beam indication signaling or a beam indication signal is prohibit from being sent at the other subsequent target sending positions.

At 305, the user equipment determines receiving positions for monitoring synchronous block signals within the set transmission period, and monitors data to be transmitted sent by the data sending terminal at the receiving positions.

In some embodiments, the system may preliminarily establish correspondences between synchronous block signals and transmission beams according to implicit rules. When data is sent through a transmission beam, the data to be transmitted corresponding with the transmission beam (such as a synchronous block signal, a random access preamble) is selected to be sent.

In some embodiments, the synchronous block signal may explicitly carry beam information for identifying the transmission beam. Therefore, the data to be transmitted can indicate a transmission beam corresponding to the data.

At 306, the user equipment determines an optimal transmission beam based on monitoring results.

In some embodiments, for operation 306, reference may be made to the description of operation 103 in the embodiment shown in FIG. 1A, and details are not described here.

In some embodiments, an implementation manner of determining the optimal transmission beam during the initial access process of the user equipment is disclosed. When the base station is unable to transmit a synchronous block signal using a beam within a set transmission period due to failed channel detection, the base station sends beam indication signaling or a beam indication signal at other sending positions within the set transmission period, and the user equipment can determine an optimal transmission beam as soon as possible, thereby avoiding the problem in the related art that the user equipment is unable to determine an optimal beam during the initial access process when the channel is busy.

Figure 4:
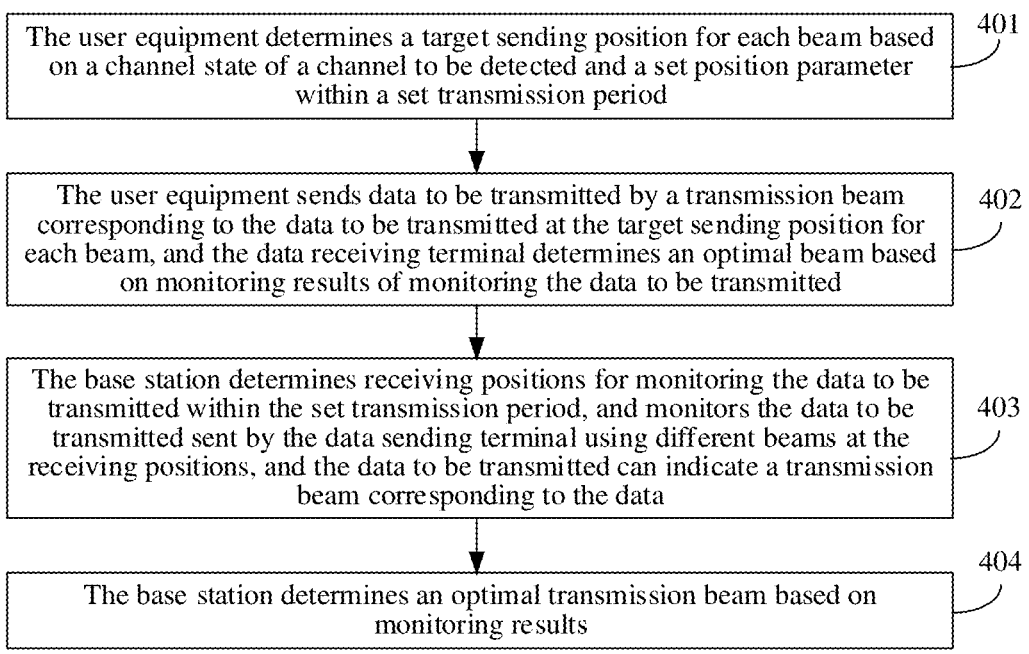
FIG. 4 is a flowchart of interaction between entities in another method for selecting a beam according to some embodiments of the present disclosure.

FIG. 4 is a flowchart of interaction between entities in another method for selecting a beam according to some embodiments of the present disclosure. The above method according to the embodiments of the present disclosure is used in some embodiments, in which a user equipment is taken as a data sending terminal, a base station is taken as a data receiving terminal, a random access preamble is taken as data to be transmitted, for exemplary illustration. As shown in FIG. 4, the following operations are included.

At 401, the user equipment determines a target sending position for each beam based on a channel state of a channel to be detected and a set position parameter within a set transmission period.

In some embodiments, the user equipment may receive a position parameter sent by a base station through RRC signaling, an MAC CE or physical layer signaling, and determine a target sending position based on the position parameter.

In some embodiments, the use equipment may determine the position parameter for monitoring data to be transmitted within the set transmission period based on system agreement, and determine a target sending position based on the position parameter.

At 402, the user equipment sends data to be transmitted by a transmission beam corresponding to the data to be transmitted at the target sending position for each beam, and the data receiving terminal determines an optimal beam based on monitoring results of monitoring the data to be transmitted.

At 403, the base station determines receiving positions for monitoring the data to be transmitted within the set transmission period, and monitors the data to be transmitted sent by the data sending terminal using different beams at the receiving positions, and the data to be transmitted can indicate a transmission beam corresponding to the data.

At 404, the base station determines an optimal transmission beam based on monitoring results.

In some embodiments, for the operations 403 and 404, reference may be made to the description of operations 203 and 204 in the embodiment shown in FIG. 2, and details are not described here.

In some embodiments, after determining the optimal transmission beam, the base station may send a message indicating the optimal transmission beam to the user equipment. For example, the base station determines beam 3 as a beam with the best signal quality based on the monitoring results of monitoring the random access preamble, and may indicate to the user equipment that beam 3 is a beam with the best signal quality. In this way, the user equipment may preferentially use beam 3 when subsequently sending data to the base station.

In this embodiment, an implementation manner of determining the optimal transmission beam during the initial access process of the user equipment is disclosed. The user equipment may send random access preambles at multiple sending positions using different beams in a random access process, and the base station determines an optimal beam for communication during the initial access process, thereby avoiding the problem in the related art that the user equipment cannot determine the optimal beam during the initial access process when the channel is busy.

Figure 5:
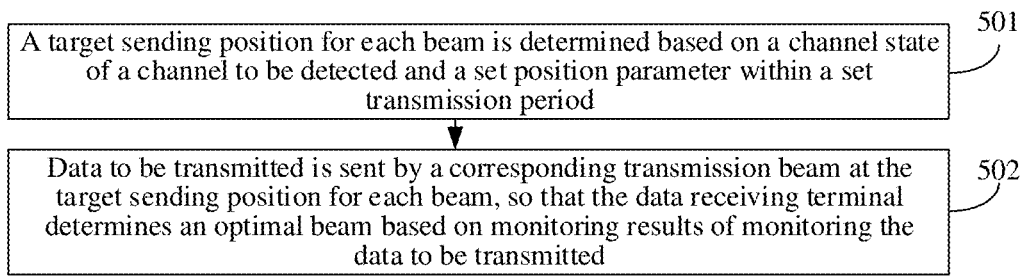
FIG. 5 is a flowchart of a method for selecting a beam according to some embodiments of the present disclosure.

FIG. 5 is a flowchart of a method for selecting a beam according to some embodiments of the present disclosure. The method for selecting a beam may be applied to a data sending terminal, such as a user equipment and a base station. As shown in FIG. 5, the method for selecting a beam includes the following operations 501 to 502.

At 501, a target sending position for each beam is determined based on a channel state of a channel to be detected and a set position parameter within a set transmission period.

Figure 6:
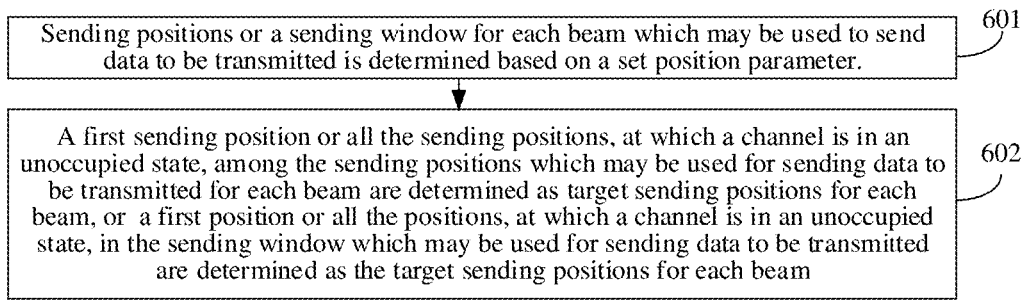
FIG. 6 is another flowchart of another method for selecting a beam according to some embodiments of the present disclosure.

In some embodiments, an implementation manner of determining the target sending position may refer to the embodiment shown in FIG. 6, which will not be described in detail here.

In some embodiments, the set position parameter may be set by the base station, or may be set by the system through agreement.

In some embodiments, regarding the implementation manner of determining the target sending position, reference may be made to the description of operation 201 of the embodiment shown in FIG. 2 or the description of operation 401 of the embodiment shown in FIG. 4, which is not be described in detail here.

At 502, data to be transmitted is sent by a transmission beam corresponding to the data at the target sending position for each beam, so that the data receiving terminal determines an optimal beam based on monitoring results of monitoring the data to be transmitted.

In some embodiments, if the user equipment is a data sending terminal, the user equipment may send a random access preamble by a corresponding transmission beam at a target sending position. In some embodiments, if the base station is a data sending terminal, the base station may send a synchronous block signal, or a synchronous block signal and beam indication signaling or a beam indication signal by a corresponding transmission beam at the target sending position.

In some embodiments, if the base station is the data sending terminal, the data to be transmitted can be sent and received in the manners described in the embodiments shown in FIG. 2 and FIG. 3A, which will not be described in detail here.

In some embodiments, if the user equipment is a data sending terminal, the data to be transmitted can be sent and received in the manner described in the embodiment shown in FIG. 4, which will not be described in detail here.

In this embodiment, an implementation manner of determining the optimal transmission beam during the initial access process of the user equipment is disclosed. The data sending terminal may determine multiple sending positions based on the set position parameter, and selects a target sending position from multiple sending positions based on a channel state, so that the user equipment can obtain the optimal transmission beam as soon as possible.

FIG. 6 is another flowchart of a method for selecting a beam according to some embodiments of the present disclosure. The above method according to the embodiments of the present disclosure is used in some embodiments to exemplarily illustrate how the data sending terminal determines a target sending position. As shown in FIG. 6, the following operations are included.

At 601, sending positions or a sending window for each beam which may be used to send data to be transmitted is determined based on a set position parameter.

In some embodiments, the set position parameter may be a set of multiple sending positions. In some embodiments, the set position parameter may also be a sending window for sending a synchronous block signal.

At 602, a first sending position or all the sending positions, at which a channel is in an unoccupied state, among the sending positions which may be used for sending data to be transmitted for each beam are determined as target sending positions for each beam. Alternatively, a first sending position or all the sending positions, at which a channel is in an unoccupied state, in the sending window which may be used for sending data to be transmitted are determined as the target sending positions for each beam.

In some embodiments, for unlicensed spectrum resources, the data sending terminal performs channel detection before sending data at the sending positions or the sending window which may be used to send data to be transmitted. If the channel detection indicates that a channel state is an unoccupied state, the sending positions or the sending window which may be used to send the data to be transmitted may be determined as the target sending position. In some embodiments, for each beam, all the sending positions, at which a channel is in an unoccupied state, may be determined as the target sending positions. In some embodiments, for each beam, only a first sending position, at which a channel is an unoccupied state, may be determined as the target sending position.

In some embodiments, after the sending positions or the sending window that may be used to send the data to be transmitted is determined based on the set position parameter, a target sending position may be further determined by channel detection, for sending data.

Figure 7:
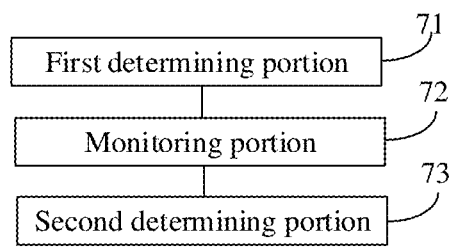
FIG. 7 is a block diagram of a device for selecting a beam according to some embodiments of the present disclosure.

FIG. 7 is a block diagram of a device for selecting a beam according to some embodiments of the present disclosure. The device for selecting a beam is applied to the data receiving terminal. As shown in FIG. 7, the terminal for selecting a beam includes a first determining portion 71, a monitoring portion 72 and a second determining portion 73.

The first determining portion 71 is configured to determine receiving positions for monitoring data to be transmitted within a set transmission period.

The monitoring portion 72 is configured to monitor the data to be transmitted sent by a data sending terminal using different beams at the receiving positions. The data to be transmitted can indicate a transmission beam corresponding to the data.

The second determining portion 73 is configured to determine an optimal transmission beam based on monitoring results.

Figure 8:
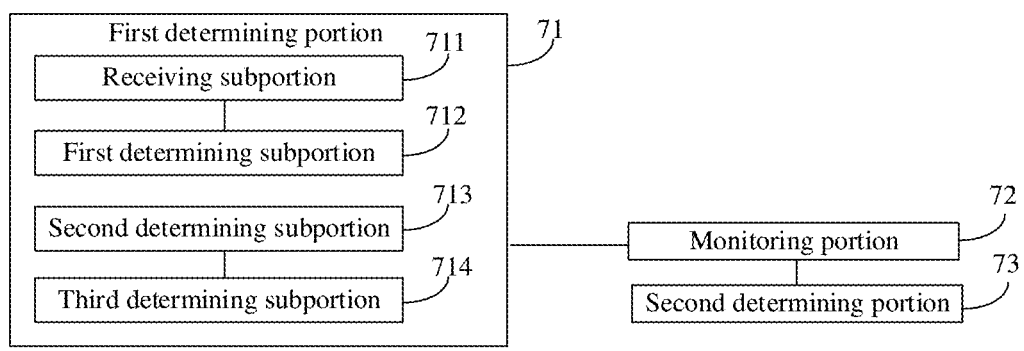
FIG. 8 is a block diagram of another device for selecting a beam according to some embodiments of the present disclosure.

FIG. 8 is a block diagram of a device for selecting a beam according to some embodiments of the present disclosure. As shown in FIG. 8, based on the embodiment shown in FIG. 7 above, in some embodiments, the first determining portion 71 includes a receiving subportion 711 and a first determining subportion 712. Alternatively, the first determining portion includes a second determining subportion 713 and a third determining subportion 713.

The receiving subportion 711 is configured to receive a position parameter sent by a base station through RRC signaling, an MAC CE or physical layer signaling.

The first determining subportion 712 is configured to determine receiving positions based on the position parameter, or determine a receiving window containing multiple receiving positions based on the position parameter.

The second determining subportion 713 is configured to determine a position parameter for monitoring the data to be transmitted within the set transmission period based on the system agreement.

The third determining subportion 714 is configured to determine receiving positions based on the position parameter, or determine a receiving window containing multiple receiving positions based on the position parameter.

In some embodiments, if the data receiving terminal is a user equipment, the data to be transmitted is a synchronous block signal.

Alternatively, the data to be transmitted is a synchronous block signal, beam indication signaling or a beam indication signal.

In some embodiments, the beam indication signal is a pre-defined pilot sequence, and the beam indication signaling or the beam indication signal carries beam information of a data transmission beam.

In some embodiments, if the data receiving terminal is a base station, the data to be transmitted is a random access preamble.

In some embodiments, the second determining portion 73 is configured to determine a data transmission beam corresponding to the data to be transmitted with the highest receiving quality as an optimal transmission beam.

Figure 9:
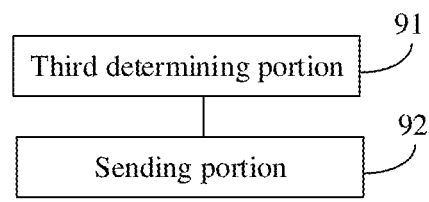
FIG. 9 is a block diagram of a device for selecting a beam according to some embodiments of the present disclosure.

FIG. 9 is a block diagram of a device for selecting a beam according to some embodiments of the present disclosure. The device for selecting a beam is applied to the data sending terminal. As shown in FIG. 9, the device for selecting a beam includes a third determining portion 91 and a sending portion 92.

The third determining portion 91 is configured to determine a target sending position for each beam based on a channel state of a channel to be detected and a set position parameter within a set transmission period;

The sending portion 92 is configured to send the data to be transmitted by a corresponding transmission beam at the target sending position for each beam, so that the data receiving terminal determines an optimal beam based on monitoring results of monitoring the data to be transmitted.

Figure 10:
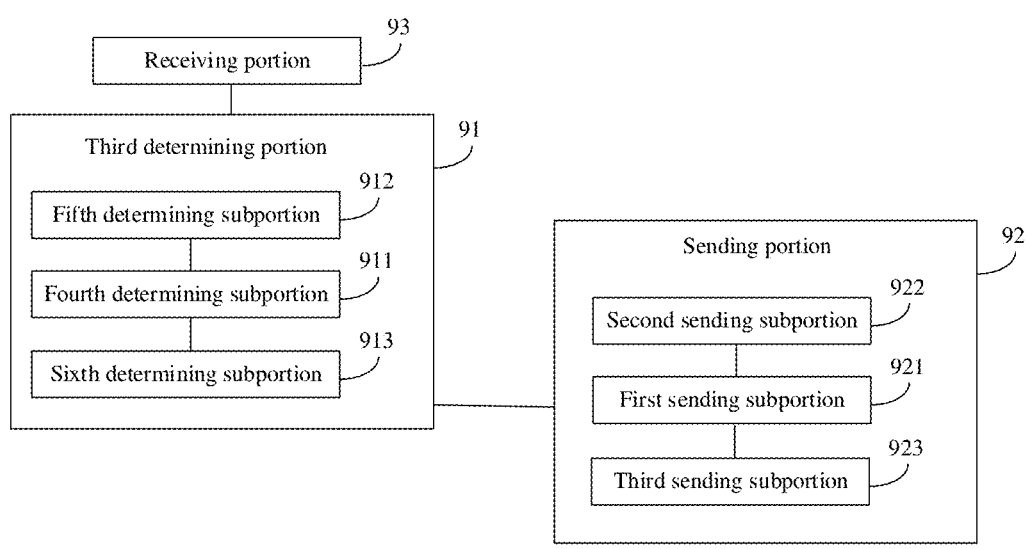
FIG. 10 is a block diagram of another device for selecting a beam according to some embodiments of the present disclosure.

FIG. 10 is another block diagram of a device for selecting a beam according to some embodiments of the present disclosure. As shown in FIG. 10, based on the embodiment shown in FIG. 9 above, in some embodiments, the third determining portion 91 includes a fourth determining subportion 911, a fifth determining subportion 912 and a sixth determining subportion 913.

The fourth determining subportion 911 is configured to determine sending positions or a sending window which may be used to send the data to be transmitted for each beam based on the set position parameter.

The fifth determining subportion 912 is configured to determine a sending position, at which a channel is in an unoccupied state, among the sending positions which may be used to send the data to be transmitted for each beam as a target sending position for each beam.

The sixth determining subportion 913 is configured to determine a position, at which a channel is in an unoccupied state, in the sending window which may be used to send the data to be transmitted as a target sending position for each beam.

In some embodiments, the set position parameter is obtained by system agreement, or the set position parameter is set by a base station.

In some embodiments, if the data sending terminal is a base station, the sending portion 92 includes a first sending subportion 921, a second sending subportion 922 and a third sending subportion 923.

The first sending subportion 921 is configured to send a synchronous block signal by a corresponding transmission beam at a first position for sending the synchronous block signal in the target sending position.

The second sending subportion 922 is configured to send beam indication signaling, a beam indication signal or a synchronous block signal by a corresponding transmission beam at other subsequent target sending positions, if the synchronous block signal is not successfully sent.

The third sending subportion 923 is configured to continue sending beam indication signaling, a beam indication signal or a synchronous block signal at other subsequent target sending positions, or prohibit from sending beam indication signaling, a beam indication signal or a synchronous block signal at other subsequent target sending positions, if the synchronous block signal is successfully sent.

In some embodiments, the beam indication signal is a pre-defined pilot sequence, and the beam indication signaling or the beam indication signal carries beam information of a data transmission beam.

In some embodiments, if the data transmitting terminal is a user equipment, the device further includes a receiving portion 93.

The receiving portion 93 is configured to receive a position parameter sent by the base station through RRC signaling, or an MAC CE or physical layer signaling.

In some embodiments, the sending portion 92 is configured to send a random access preamble by a corresponding transmission beam at the target sending position for each beam.

Regarding the device in the above embodiment, the specific manner in which each portion performs the operations has been described in detail in some embodiments of the method, and will not be elaborated here.

Figure 11:
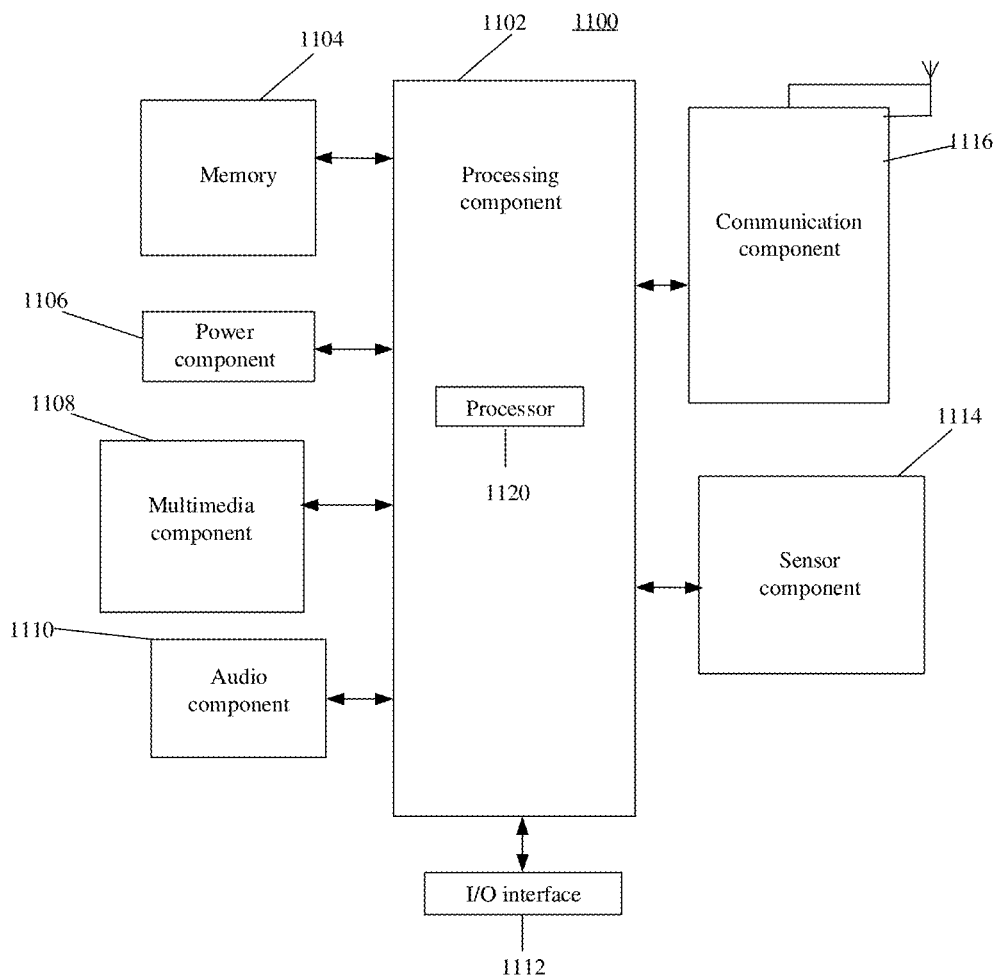
FIG. 11 is a block diagram of a device applied for selecting a beam according to some embodiments of the present disclosure.
Figure 12:
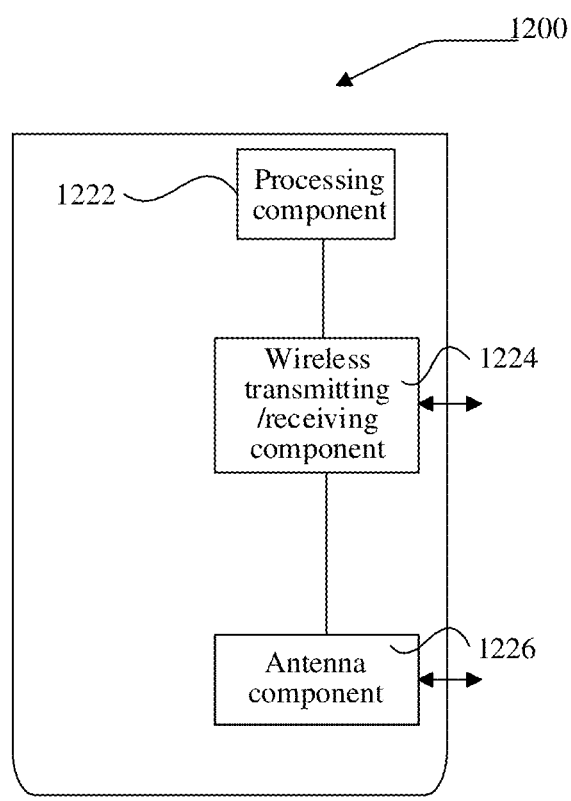
FIG. 12 is a block diagram of a device applied for selecting a beam according to some embodiments of the present disclosure.

The data receiving terminal provided by the embodiment of the present disclosure may be the user equipment shown in FIG. 11 or the base station shown in FIG. 12. The data sending terminal provided by the embodiment of the present disclosure may be the user equipment shown in FIG. 11, or may be the base station shown in FIG. 12.

FIG. 11 is a block diagram of a device applied for selecting a beam according to some embodiments of the present disclosure. For example, the device 1100 may be a user equipment such as a mobile phone, a computer, a digital broadcasting terminal, a messaging device, a game console, a tablet device, a medical device, a fitness device, and a personal digital assistant.

Referring to FIG. 11, the device 1100 may include one or more of the following components: a processing component 1102, a memory 1104, a power component 1106, a multimedia component 1108, an audio component 1110, an Input/Output (I/O) interface 1112, a sensor component 1114 and a communication component 1116.

The processing component 1102 is typically configured to control overall operations of the device 1100, such as the operations associated with display, telephone calls, data communications, camera operations, and recording operations. The processing component 1102 may include one or more processors 1120 to execute instructions to perform all or part of the operations in the abovementioned method. Moreover, the processing component 1102 may include one or more modules which facilitate interaction between the processing component 1102 and other components. For instance, the processing component 1102 may include a multimedia module to facilitate interaction between the multimedia component 1108 and the processing component 1102.

The memory 1104 is configured to store various types of data to support the operation of the device 1100. Examples of such data include instructions for any application programs or methods operated on the device 1100, contact data, phonebook data, messages, pictures, video, etc. The memory 1104 may be implemented by any type of volatile or non-volatile memory devices, or a combination thereof, such as an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 1106 is configured to provide power for various components of the device 1100. The power component 1106 may include a power management system, one or more power supplies, and other components associated with generation, management and distribution of power for the device 1100.

The multimedia component 1108 includes a screen for providing an output interface between the device 1100 and a user. In some embodiments, the screen may include a Liquid Crystal Display (LCD) and a Touch Panel (TP). In some embodiments, an organic light-emitting diode (OLED) display or other types of displays can be employed.

If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action but also detect a duration and pressure associated with the touch or swipe action. In some embodiments, the multimedia component 1108 may include a front camera and/or a rear camera. The front camera and/or the rear camera may receive external multimedia data when the terminal 1100 is in an operation mode, such as a photographing mode or a video mode. Each of the front camera and the rear camera may be a fixed optical lens system or have focusing and optical zooming capabilities.

The audio component 1112 is configured to output and/or input an audio signal. For example, the audio component 1112 includes a Microphone (MIC), and the MIC is configured to receive an external audio signal when the device 1100 is in the operation mode, such as a call mode, a recording mode and a voice recognition mode. The received audio signal may further be stored in the memory 1104 or transmitted by the communication component 1116. In some embodiments, the audio component 1112 further includes a speaker for outputting audio signals.

The I/O interface 1112 is configured to provide an interface between the processing component 1102 and a peripheral interface module, and the peripheral interface module may be a keyboard, a click wheel, a button and the like. The button may include, but be not limited to: a home button, a volume button, a starting button and a locking button.

The sensor component 1114 may include one or more sensors configured to provide status assessment in various aspects for the device 1100. For instance, the sensor component 1114 may detect an on/off status of the device 1100 and relative positioning of components, such as a display and small keyboard of the device 1100, and the sensor component 1114 may further detect a change in a position of the device 1100 or a component of the device 1100, presence or absence of contact between the user and the device 1100, orientation or acceleration/deceleration of the device 1100 and a change in temperature of the device 1100. The sensor component 1114 may include a proximity sensor configured to detect presence of an object nearby without any physical contact. The sensor component 1114 may also include a light sensor, such as a Complementary Metal Oxide Semiconductor (CMOS) or Charge Coupled Device (CCD) image sensor, configured for use in an imaging APP. In some embodiments, the sensor component 1114 may also include an acceleration sensor, a gyroscope sensor, a magnetic sensor, a pressure sensor or a temperature sensor.

The communication component 1116 is configured to facilitate wired or wireless communication between the device 1100 and other equipment. The device 1100 may access a communication-standard-based wireless network, such as a Wi-Fi, 2G, 3G, 4G, 5G or a combination thereof. In some exemplary embodiments, the communication component 1116 is configured to receive a broadcast signal or broadcast associated information from an external broadcast management system through a broadcast channel. In some embodiments of the present disclosure, the communication component 1116 may further include a Near Field Communication (NFC) module to facilitate short-range communication. For example, the NFC module may be implemented based on a Radio Frequency Identification (RFID) technology, an Infrared Data Association (IrDA) technology, an Ultra-Wide Band (UWB) technology, a Bluetooth (BT) technology and another technology.

In some embodiments of the present disclosure, the device 1100 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to perform the method in first or second aspect of embodiments.

In some embodiments of the present disclosure, a non-transitory computer-readable storage medium including instructions is further provided, such as the memory 1104 including instructions. The instructions, when executed may configure the processor 1120 of the device 1100 to implement the method in first or second aspect of embodiments.

FIG. 12 is a block diagram of a device applicable for selecting a beam according to some embodiments of the present disclosure. The device 1200 can be embodied as a base station. Referring to FIG. 12, the device 1200 includes a processing component 1222, a wireless transmitting/receiving component 1224, an antenna component 1226, and a signal processing part unique to a wireless interface. The processing component 1222 may further include one or more processors.

One of the processors in the processing component 1222 may be configured to perform the method in the first or the second aspect of the embodiments.

In some embodiments of the present disclosure, a non-transitory computer-readable storage medium including instructions is also provided in the base station, and the computer instructions are stored in the storage medium. The instructions, when executed by the processor, implement the method in the first or the second aspect of the embodiments.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A method for selecting a beam, applied to a data receiving terminal, and comprising:
   determining receiving positions for monitoring data to be transmitted within a set transmission period;
   monitoring, at the receiving positions, the data to be transmitted sent by a data sending terminal using different beams, wherein the data to be transmitted is able to indicate a transmission beam corresponding to the data; and
   determining an optimal transmission beam based on monitoring results,
   the determining the optimal transmission beam based on the monitoring results comprising:
   determining a data transmission beam corresponding to the data to be transmitted with a highest receiving quality as the optimal transmission beam,
   wherein the receiving quality is a signal receiving quality,
   wherein in response to that the data receiving terminal is a user equipment, the data to be transmitted is beam indication signaling or a beam indication signal; and
   wherein the data receiving terminal is configured to monitor a synchronous block signal or other signaling or signal that indicate a transmission beam in at least two receiving positions within a synchronous block signal transmission period.

2. The method of claim 1, wherein the determining the receiving positions for monitoring the data to be transmitted within the set transmission period comprises:
   receiving a position parameter sent by a base station through radio resource control (RRC) signaling, a media access control (MAC) control element (CE) or physical layer signaling; and
   determining receiving positions based on the position parameter, or determining a receiving window containing a plurality of receiving positions based on the position parameter.

3. The method of claim 1, wherein the determining the receiving positions for monitoring the data to be transmitted within the set transmission period comprises:
   determining a position parameter for monitoring the data to be transmitted within the set transmission period based on system agreement; and
   determining receiving positions based on the position parameter, or determining a receiving window containing a plurality of receiving positions based on the position parameter.

4. A communication system implementing the method of claim 1, comprising the data receiving terminal and the data sending terminal, which include a base station and user equipment (UE), wherein the data receiving terminal is configured to:
   determine an optimal transmission beam based on monitoring results;
   thereby enabling the data receiving terminal to monitor the data to be transmitted in more than two receiving positions during an initial access process of the UE when communication channels are busy, and to determine the optimal transmission beam for communication.

5. The method of claim 1, wherein the beam indication signal is a pre-defined pilot sequence, and the beam indication signaling or the beam indication signal carries beam information of a data transmission beam.

6. A method for selecting a beam, applied to a data sending terminal, and comprising:
   determining a target sending position for each beam based on a channel state of a channel to be detected and a set position parameter within a set transmission period; and
   sending, by a corresponding transmission beam, data to be transmitted at the target sending position for each beam, wherein a data receiving terminal determines an optimal beam based on monitoring results of monitoring the data to be transmitted,
   wherein the determining the target sending position for each beam based on the channel state of the channel to be detected and the set position parameter within the set transmission period comprises:

determining, based on the set position parameter, sending positions or a sending window which is able to be used to send the data to be transmitted for each beam;

determining, among the sending positions which are able to be used to send the data to be transmitted for each beam, a first sending position or all of the sending positions at which a channel is in an unoccupied state as the target sending position for each beam; or determining, in the sending window which is able to be used to send the data to be transmitted, a first position or all of the positions at which a channel is in an unoccupied state as the target sending position for each beam.

7. The method of claim 6, wherein the set position parameter is obtained by system agreement or the set position parameter is set by a base station.

8. The method of claim 6, wherein in response to that the data sending terminal is a base station, the sending by the corresponding transmission beam the data to be transmitted at the target sending position for each beam comprises:

sending, by the corresponding transmission beam, a synchronous block signal at a first position for sending the synchronous block signal in the target sending positions;

in response to that the synchronous block signal is not successfully sent, sending, by corresponding transmission beams, beam indication signaling or a beam indication signal, or a synchronous block signal at another target sending position; and in response to that the synchronous block signal is successfully sent, continuing sending beam indication signaling, a beam indication signal or a synchronous block signal at other subsequent target sending positions, or prohibiting from sending beam indication signaling, a beam indication signal or a synchronous block signal at other subsequent target sending positions.

9. The method of claim 8, wherein the beam indication signal is a pre-defined pilot sequence, and the beam indication signaling or the beam indication signal carries beam information of a data transmission beam.

10. The method of claim 6, wherein in response to that the data sending terminal is user equipment, the method further comprises:

receiving the set position parameter sent by a base station through radio resource control (RRC) signaling, a media access control (MAC) control element (CE) or physical layer signaling.

11. The method of claim 10, wherein the sending by the corresponding transmission beam the data to be transmitted at the target sending position for each beam comprises:

sending a random access preamble by a corresponding transmission beam at the target sending position for each beam.

12. A device for selecting a beam, applied to a data receiving terminal, and comprising:

a processor;

memory for storing processor-executable instructions;

wherein the processor is configured to:

determine receiving positions for monitoring data to be transmitted within a set transmission period;

monitor, at the receiving positions, the data to be transmitted sent by a data sending terminal using different beams, wherein the data to be transmitted is able to indicate a transmission beam corresponding to the data; and determine an optimal transmission beam based on monitoring results, wherein the processor is further configured to:

determine a data transmission beam corresponding to the data to be transmitted with a highest receiving quality as the optimal transmission beam, wherein the receiving quality is a signal receiving quality, wherein in response to that the data receiving terminal is a user equipment, the data to be transmitted is beam indication signaling or a beam indication signal; and wherein the data receiving terminal is configured to monitor a synchronous block signal or other signaling or signal that indicate a transmission beam in at least two receiving positions within a synchronous block signal transmission period.

13. The device of claim 12, wherein the processor is further configured to:

receive a position parameter sent by a base station through radio resource control (RRC) signaling, a media access control (MAC) control element (CE) or physical layer signaling; and determine receiving positions based on the position parameter, or determine a receiving window containing a plurality of receiving positions based on the position parameter.

14. The device of claim 12, wherein the processor is further configured to:

determine a position parameter for monitoring the data to be transmitted within the set transmission period based on system agreement; and determine receiving positions based on the position parameter, or determine a receiving window containing a plurality of receiving positions based on the position parameter.

15. The device of claim 12, wherein the beam indication signal is a pre-defined pilot sequence, and the beam indication signaling or the beam indication signal carries beam information of a data transmission beam.

* * * * *